United States Patent
Conroy et al.

(10) Patent No.: US 8,068,568 B2
(45) Date of Patent: Nov. 29, 2011

(54) METHOD AND SYSTEM FOR A SLIDING WINDOW PHASE ESTIMATOR FOR WIDEBAND CODE DIVISION MULTIPLE ACCESS (WCDMA) AUTOMATIC FREQUENCY CORRECTION

(75) Inventors: Hendrik Johannes Conroy, San Diego, CA (US); Joseph Boccuzzi, Manalapan, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/005,263

(22) Filed: Jan. 12, 2011

(65) Prior Publication Data

US 2011/0110466 A1    May 12, 2011

Related U.S. Application Data

(63) Continuation of application No. 11/565,567, filed on Nov. 30, 2006, now Pat. No. 7,873,125.

(51) Int. Cl.
H03L 27/06    (2006.01)

(52) U.S. Cl. ........................................ 375/344; 375/349

(58) Field of Classification Search .................. 375/344, 375/349, 144, 147, 345, 347
See application file for complete search history.

(56) References Cited

U.S. PATENT DOCUMENTS

| | | | |
|---|---|---|---|
| 6,625,434 B1 * | 9/2003 | Arimitsu et al. | 455/259 |
| 7,873,125 B2 * | 1/2011 | Conroy et al. | 375/344 |
| 2008/0020713 A1 * | 1/2008 | Krishnan | 455/70 |

* cited by examiner

*Primary Examiner* — Emmanuel Bayard
(74) *Attorney, Agent, or Firm* — McAndrews, Held & Malloy, Ltd.

(57) ABSTRACT

Aspects of a method and system for a sliding window phase estimator for wideband code division multiple access (WCDMA) automatic frequency correction are presented. Aspects of the system may include one or more circuits that enable adjustment of a current demodulation frequency for receiving at least one subsequent symbol based on a computed weighted sum of a plurality of computed frequency error values. Each of the plurality of computed frequency error values may be derived from a current symbol, a corresponding previous symbol, and/or a previous frequency error value. The current symbol may include a current received symbol segment and one or more previously received symbol segments.

20 Claims, 10 Drawing Sheets

US 8,068,568 B2

METHOD AND SYSTEM FOR A SLIDING WINDOW PHASE ESTIMATOR FOR WIDEBAND CODE DIVISION MULTIPLE ACCESS (WCDMA) AUTOMATIC FREQUENCY CORRECTION

CROSS-REFERENCE TO RELATED APPLICATIONS/INCORPORATION BY REFERENCE

This application is a continuation of U.S. application Ser. No. 11/565,567 filed on Nov. 30, 2006, which application makes reference to: U.S. application Ser. No. 11/565,579, filed on even date herewith.

The above stated application is hereby incorporated herein by reference in its entirety.

FIELD OF THE INVENTION

Certain embodiments of the invention relate to wireless communication. More specifically, certain embodiments of the invention relate to a method and system for a sliding window phase estimator for wideband code division multiple access (WCDMA) automatic frequency correction.

BACKGROUND OF THE INVENTION

Cellular communication systems provide wireless communication services in many populated areas of the world. While cellular communication systems were initially constructed to service voice communications, they are now called upon to support data communications as well. The demand for data communication services has exploded with the acceptance and widespread use of the Internet. While data communications have historically been serviced via wired connections, cellular users now demand that their wireless units also support data communications. Many wireless subscribers now expect to "surf" the Internet, access email, and perform other data communication activities using their cellular phones, wireless personal data assistants, wirelessly linked notebook computers, and/or other wireless devices. The demand for data communications in wireless communication systems continues to increase with time. Thus, existing wireless communication systems are currently being created or modified to service these burgeoning data communication demands.

Cellular networks include a network infrastructure that wirelessly communicates with wireless terminals within a respective service area. The network infrastructure typically includes a plurality of base stations dispersed throughout the service area, each of which supports wireless communications within a respective cell or set of sectors. The base stations may be coupled to base station controllers (BSCs), with each BSC serving a plurality of base stations. Each BSC is coupled to a mobile switching center (MSC). Each BSC also typically directly or indirectly coupled to the Internet.

In operation, each base station (BS) communicates with a plurality of wireless terminals operating in its cell/sectors. A BSC coupled to the base station routes voice communications between the MSC and the serving base station. The MSC routes the voice communication to another MSC or to the PSTN, for example. The BSCs route data communications between a servicing base station and a packet data network that may include or couple to the Internet. Transmissions from base stations to wireless terminals are referred to as "forward link or downlink" transmissions while transmissions from wireless terminals to base stations are referred to as "reverse link or uplink" transmissions.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

A mobile handset may synchronize its timing to the timing of a base station to enable the mobile handset to communicate via the network. In some conventional WCDMA networks, synchronization and timing acquisition between a mobile handset and a base station, or coarse acquisition, may comprise at least a 3-step process. The first step is referred to as a slot timing process. The second step may be referred to as a frame timing process. The third step may involve determining the scrambling code utilized by the base station that was identified during the slot timing and frame timing processes. A signal scrambled at a base station by utilizing a selected scrambling code may be unscrambled by utilizing the selected scrambling code at the mobile terminal. The mobile terminal may utilize a plurality of potential scrambling codes when determining which of the potential scrambling codes is utilized at the identified base station. The mobile terminal may utilize the selected scrambling code to unscramble a spread spectrum signal received from the base station.

After establishing coarse acquisition, the mobile handset may need to perform fine acquisition to adjust timing signals at the mobile handset to maintain synchronization with the base station in spite of Doppler effect frequency shifts that may occur with some mobile terminals, and other sources that may cause a loss of timing synchronization between the mobile handset and the base station. The mobile handset may perform fine acquisition by computing a frequency offset between a current received symbol and a previous received symbol. The mobile handset may receive a current symbol by accumulating a plurality of symbol segments. Similarly, the previous received symbol may comprise a plurality of symbol segments. The mobile handset may accumulate the symbol segments contained within the previous received symbol before beginning to accumulate symbol segments contained within the current received symbol. Consequently, the mobile handset may experience a one symbol delay between a time instant at which a current adjustment of timing signals may occur, and a time instant at which a subsequent adjustment of timing signals may occur.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a sliding window phase estimator for wideband code division multiple access (WCDMA) automatic frequency correction, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a sliding window phase estimator for wideband code division multiple access (WCDMA) automatic frequency correction. Various embodiments of the invention may comprise a method and a system that utilizes an automatic frequency control (AFC) loop to automatically adjust a demodulating frequency, which is utilized to demodulate received signals at a mobile system. The adjustment value utilized in the AFC loop may be computed based on computed frequency offset values. The AFC loop may enable compensation of frequency offsets that may occur between data symbols received via a common pilot channel (CPICH), for example. A data symbol may be received by accumulating a plurality of constituent descrambled segments. In one aspect of the invention, frequency offset values, and corresponding adjustment values, may be computed at a rate of one per descrambled segment. This may enable frequency offset value adjustments to occur more rapidly than may be the case in systems, which compute adjustment values at a rate of one per data symbol.

Figure 1:
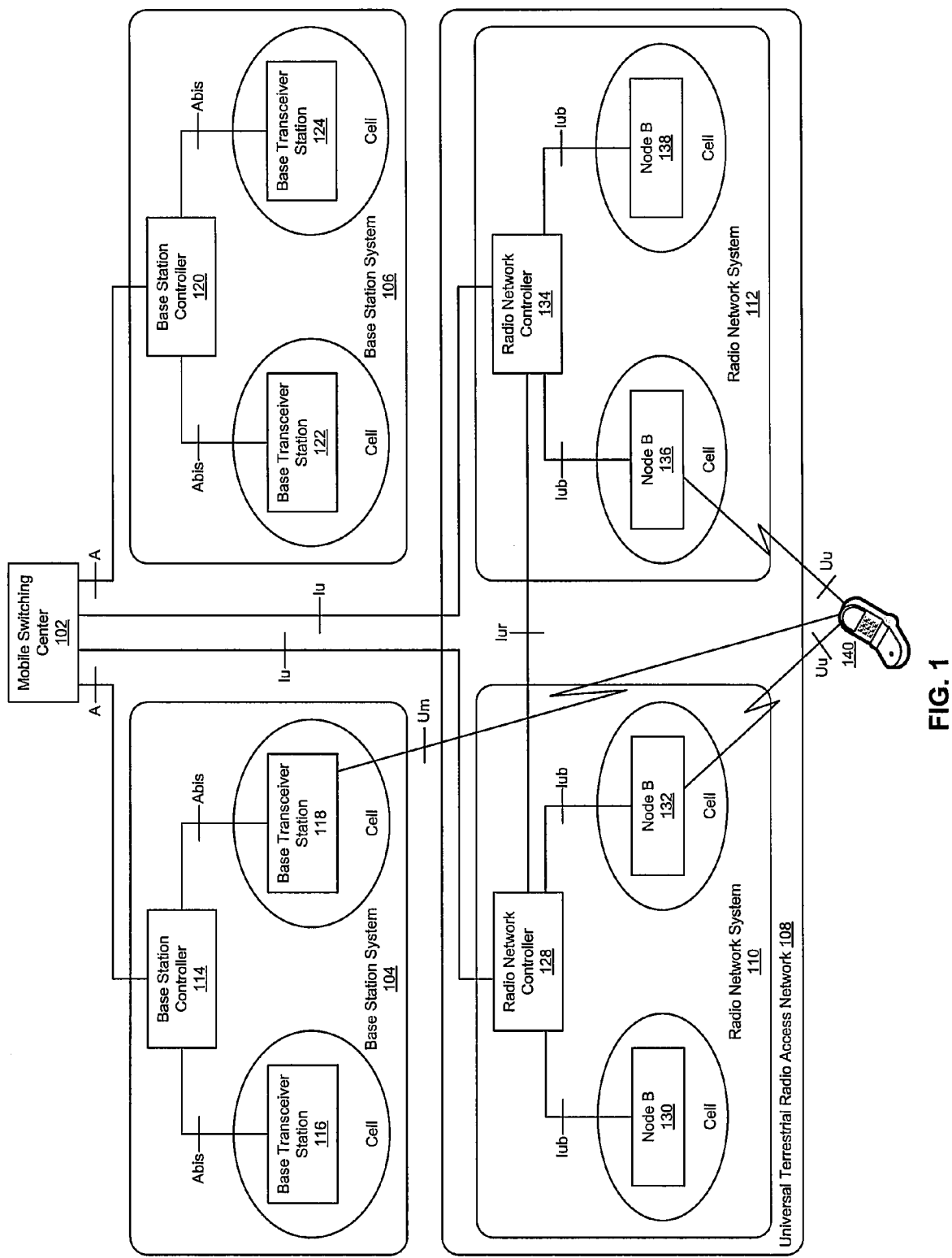
FIG. 1 illustrates an exemplary $3^{rd}$ generation (3G) GSM network, which may be utilized in connection with an embodiment of the invention.

FIG. 1 illustrates an exemplary $3^{rd}$ generation (3G) GSM network, which may be utilized in connection with an embodiment of the invention. Referring to FIG. 1 there is shown a mobile switching center (MSC) 102, a base station system (BSS) 104, a BSS 106, a universal terrestrial radio access network (UTRAN) 108, and a mobile station (MS) 140. The BSS 104 may comprise a base station controller (BSC) 114, a base transceiver station (BTS) 116, and a BTS 118. The BSS 106 may comprise a BSC 120, a BTS 122, and a BTS 124. The UTRAN 108 may comprise a radio network system (RNS) 110, and an RNS 112. The RNS 110 may comprise a radio network controller (RNC) 128, a node B 130, and a node B 132. The RNS 112 may comprise a RNC 134, a node B 136, and a node B 138.

The MSC 102 may be coupled to the BSC 114 via an A interface, and to the BSC 120 via an A interface. The MSC 102 may be coupled to the RNC 128 via an Iu interface. The MSC 102 may be coupled to the RNC 134 via an Iu interface. The BSC 114 may be coupled to the BTS 116 via an Abis interface. The BSC 114 may be coupled to the BTS 118 via an Abis interface. The BSC 120 may be coupled to the BTS 122 via an Abis interface and to the BTS 124 via an Abis interface. The RNC 128 may be coupled to the node B 130 via an Iub interface and to the node B 132 via an Iub interface. The RNC 134 may be coupled to the node B 136 via an Iub interface, and to the node B 138 via an Iub interface. The RNC 128 may be coupled to the RNC 134 via an Iur interface. The MS 140 may be coupled to a BTS via a Um interface. The MS 140 may be coupled to a node B via a Uu interface.

The elements of a $2^{nd}$ generation wireless network (such as a GSM network, IS-95 network, or WCDMA network, for example) may comprise one or more MSC 102 elements, and one or more BSS 104 elements. The elements of a 3G GSM network may comprise one or more MSC 102 elements, one or more BSS 104 elements, and one or more UTRAN 108 elements. The MSC 102 may comprise suitable circuitry, logic, and/or code that may enable switching functions within at least a portion of a wireless communications network. The MSC 102 may control the operation of BSC, BTS, RNC, and/or node B elements within a GSM network that enable a subscriber utilizing an MS 140 to communicate with other subscribers on the GSM network, or with subscribers on other wireless or wired networks. The MSC 102 may control the operation of the BSC 114, and BTSs 116 and 118 via an A interface. The MSC 102 may control the operation of the RNC 128, and node B elements 130 and 132 via an Iu interface. The MS 140 may communicate with a BTS 118 element via a Um interface. The MS 140 may communicate with a node B 132 element via a Uu interface.

The BSC 114 may comprise suitable circuitry, logic, and/or code that may control the operation of one or more BTS 116 elements within a BSS 104 and enable a subscriber to utilize wireless communications services within at least a portion of a service area. The area in which the subscriber may utilize the BSC 114 to receive wireless communications services may comprise a BSC area. The BSC 114 may control the operation of a BTS 116 element via an Abis interface. The BTS 116 may comprise suitable circuitry, logic, and/or code that may enable a subscriber to utilize wireless communications services within at least a portion of a BSC area. The area in which the subscriber may utilize the BTS 116 to receive wireless communications service may comprise a cell. The BTS 116 may comprise radio transceivers that may be utilized to wirelessly communicate with one or more MS 140 elements. The BTS 116 may select one or more frequencies that may be utilized to establish one or more RF channels. The RF channel(s) may be utilized to communicate with an MS 140 element. The BTS 116 may transmit information to an MS 140 element via a downlink channel. The BTS 116 may receive information from an MS 140 element via an uplink channel.

The RNC 128 may comprise suitable circuitry, logic, and/or code that may control the operation of one or more node B 130 elements within an RNS 110 and enable a subscriber to utilize wireless communications services within at least a portion of a service area. The area in which the subscriber may utilize the RNC 128 to receive wireless communications services may comprise an RNC area. The RNC 128 may control the operation of a node B 130 element via an Iub interface. The node B 130 may comprise suitable circuitry, logic, and/or code that may enable a subscriber to utilize wireless communications services within at least a portion of an RNC area. The area in which the subscriber may utilize the node B 130 to receive wireless communications service may comprise a cell. The node B 130 may comprise radio transceivers that may be utilized to wirelessly communicate with one or more MS 140 elements. The node B 130 may select one or more frequencies that may be utilized to establish one or more RF channels. The RF channel(s) may be utilized to communicate with an MS 140 element. The node B 130 may transmit information to an MS 140 element via a downlink channel. The node B 130 may receive information from an MS 140 element via an uplink channel.

The MS 140 may comprise suitable circuitry, logic, and/or code that may enable a subscriber to originate and/or receive calls and/or other services via a wireless network. The MS 140 may provide radio control management by receiving information via one or more downlink channels and/or by transmitting information via one or more uplink channels. The MS 140 may decode information received wirelessly and/or encode information to be transmitted wirelessly. The MS 140 may provide a user interface, comprising a keypad, and visual and/or audio input and output that may enable a user to originate and/or receive voice, data, and/or video communications via the wireless network. The MS 140 may provide mobility management by enabling a subscriber engaged in an established call to move from an area served by a current cell to an area served by a subsequent cell without losing the ability to subsequently continue to communicate via the established call.

The BTS 118, 122, and 124 may be substantially as described for the BTS 116. The BSC 120 may be substantially as described for the BSC 114. The BSS 106 may be substantially as described for the BSS 104. The node B 132, 136, and 138 may be substantially as described for the node B 130. The RNC 134 may be substantially as described for the RNC 128. The RNS 112 may be substantially as described for the RNS 110.

In operation, a MS 140 may be required to establish synchronization and timing acquisition, or coarse acquisition, with a BTS 118 or node B 132 prior to being able to establish a new call within the MSC area served by the MSC 102. After establishing coarse acquisition, the MS 140 may continuously perform fine acquisition. Coarse acquisition may enable a MS 140 to synchronize its local timing to the timing of a BTS or node B to within a determined tolerance, for example within a 1 chip time interval. The synchronization may be based on timing delays associated with the time instant at which signals are transmitted by the BTS 118 or node B 132, and the time instant at which a corresponding signal is received by the MS 140. Fine acquisition may enable the MS 140 to adjust to timing or frequency offsets that may occur in signals received from a BTS 118 or node B 132 that may be due to causes such as Doppler effects arising from relative changes in location between the MS 140 and the BTS or node B, or offset that may arise due to component drifts in local oscillator circuitry within the MS 140, BTS, or node B.

Each of the BTSs and/or node Bs may transmit pilot symbols via a downlink channel such as the synchronization channel (SCH). For example, the MS 140 may receive SCH signals from BTS 118, node B 132, and node B 136. The MS 140 may measure the signal strength of each of the downlink channels received by one or more BTSs and/or node Bs and select the downlink channel with the strongest received signal, for example node B 132. The MS 140 may initiate coarse acquisition the node B 132, which transmitted the selected signal.

The first step in an exemplary coarse acquisition process in a WCDMA system may be referred to as a slot timing process. A WCDMA frame may comprise 15 slots. A WCDMA frame may also be referred to as a spread spectrum frame, or a frame. The individual slots within a 15-slot frame may be labeled slot 0, slot 1, slot 2, . . . , slot 14. Slots may be transmitted at a 1,500 Hz rate, or 1 slot per ⅔ milliseconds (ms). During each slot, 2,560 chips may be transmitted for a chip rate of about 3.84 mega chips/second (Mcps). The transmitted slot may contain a primary synchronization code (PSC). The PSC may comprise the first 256 chips within a given slot. A single PSC may be transmitted during each of the 15 slots within a WCDMA frame, such that the PSC transmitted during slot 0 may contain the same information as the PSC transmitted during slots 1, 2, . . . , 14. The PSC may be utilized to determine slot timing within the communication system. The determined slot timing may correspond to a primary synchronization position. When slot timing is achieved, the node B 132 and MS 140 may be able to synchronize clock timing, based on the primary synchronization position, and to determine a time instant that indicates the beginning of a transmitted slot.

While slot synchronization may enable a MS 140 and node B 132 to mutually determine a time instant corresponding to the beginning of transmission of a slot, slot synchronization may not enable the MS 140, for example, to determine when the node B 132 is transmitting slot 0 within a WCDMA frame.

A second step in the synchronization and timing acquisition process may be referred to as a frame timing process. A transmitted slot may also comprise a secondary synchronization code (SSC). An SSC may be utilized to determine which slot within a WCDMA frame corresponds to slot 0, slot 1, slot 2, . . . , or slot 14. The SSC may comprise a sequence of 15 slots such that an $SSC_0$ may represent an SSC transmitted during slot 0, an $SSC_1$ may represent an SSC transmitted during slot 1, an $SSC_2$ may represent an SSC transmitted during slot 2, and an $SSC_{14}$ may represent an SSC transmitted during slot 14, for example. When slot timing and frame timing are achieved, the node B 132 and MS 140 may be able to synchronize clock timing and to determine time instants that indicate the beginning of a transmitted slot, which may indicate the beginning of a transmitted WCDMA frame.

After achieving frame timing, a MS 140 may be able to identify an individual BTS or node B among a plurality of BTSs or node Bs that may transmit a WCDMA signal to the MS 140. However, an individual node B 132 within a WCDMA network may transmit a signal that is scrambled by a spreading code. A scrambling code may comprise a binary sequence of bits that may be utilized to scramble a signal to produce a spread spectrum signal. The signal may be scrambled by utilizing a Gold code, for example. The node B 132 may select a scrambling code from a plurality of potential scrambling codes. The scrambling code may be a Gold code selected from among a group of 8 potential Gold codes that may be utilized to scramble a signal transmitted by the node B 132, for example.

In a third step in the synchronization and timing acquisition process, the MS 140 may determine which scrambling code may be utilized by the individual node B 132 that was identified during the slot timing and frame timing processes. A signal, scrambled at the node B 132 by utilizing a selected scrambling code, may be unscrambled by utilizing a corresponding descrambling code at the MS 140. The MS 140 may select the corresponding descrambling code by utilizing different candidate descrambling codes to descramble a signal transmitted by the node B 132 via the common pilot channel (CPICH), for example. The MS 140 may determine a signal energy associated with application of each potential descrambling code to the received signal, for example. Based on a signal energy comparison, for example, the MS 140 may select a descrambling code utilized at the identified node B 132. The MS 140 may also utilize the selected descrambling code to unscramble a spread spectrum signal received from the node B 132.

A subscriber may subsequently utilize the MS 140 to attempt to initiate a new call within the MSC area served by the MSC 102 via a node B 132 element. The MSC 102 may utilize the Iu interface to receive information in connection with the attempted call initiation from an RNC 128 element. The information may identify the location of the subscriber by indicating a specific cell associated with a node B 132 element that received the request from the MS 140 associated with the new call attempt. If the attempted call is accepted, the MSC 102 may indicate to the RNC 128 element that the new call attempt is to be accepted via the Iu interface.

In response, the RNC 128 element may allocate resources at the corresponding node B 132 element, such as a transceiver assignment and one or more downlink and/or uplink frequency assignments, which may be utilized for communicating with the MS 140. The RNC 128 element may also assign transmitting power levels and/or one or more orthogonal variable spreading factor (OVSF) codes that may be utilized during communications between the node B 132 element and the MS 140 via an assigned RF channel. The RNC 128 element may communicate these assignments to the corresponding node B 132 element via the Iub interface. The node B 132 element may subsequently utilize the assigned resources when communicating with the MS 140 via the Uu interface. The MS 140 may utilize wideband code division multiple access (W-CDMA) when utilizing an RF channel to communicate with the node B 132 element via the Uu interface.

During an existing call the MS 140 may be in motion relative to the node B 132 element. This may induce Doppler frequency shifts such that the Doppler frequency associated with one received symbol may differ from the Doppler frequency associated with a subsequent or previous received symbol. This difference in Doppler frequencies among the received symbols may in turn result in a frequency offset between received symbols. The frequency offset may produce a corresponding relative timing phase shift between received symbols. During demodulation of received symbols at the MS 140, relative frequency offsets may result in erroneous detection of one or more signal amplitudes and/or phases associated with a received signal. This may correspond to shifts in the constellation utilized for demodulating the received symbols. The constellation shifts may result in a symbol, that maps data to a given constellation point at a transmitting node B 132, being received by the MS 140, which maps the received symbol to an incorrect constellation point. Consequently, the received data may be different from the transmitted data. Thus, if the MS 140 does not detect, and compensate, the relative frequency offsets between received symbols, data transmitted from the node B 132 may be corrupted during demodulation at the MS 140.

Various embodiments of the invention may provide a method for fine acquisition that enables detection of relative frequency offsets, with corresponding adjustments in demodulation frequencies utilized at a MS 140. The adjustment in demodulation frequency may be referred to as automatic frequency control (AFC). Various embodiments of the invention may be practiced when receiving signals from BTSs or node Bs that utilize space time transmit diversity (STTD), that do not utilize STTD, or which utilize other conceivable methods of transmit diversity.

Figure 2:
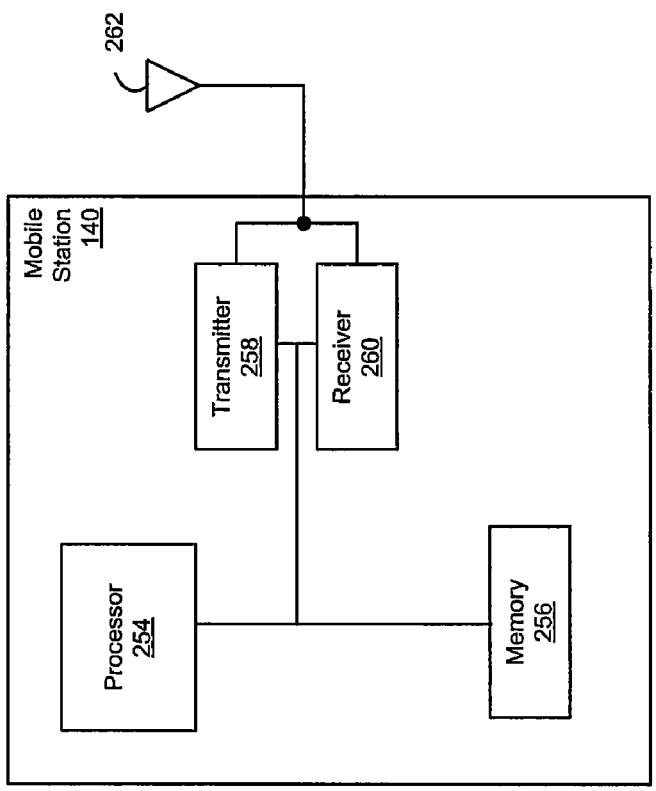
FIG. 2 is a block diagram of an exemplary mobile station, which may be utilized in connection with an embodiment of the invention.

FIG. 2 is a block diagram of an exemplary mobile station, which may be utilized in connection with an embodiment of the invention. Referring to FIG. 2, there is shown a mobile station (MS) 140, and an antenna 262. The MS 140 may comprise a processor 254, memory 256, a transmitter 258, and a receiver 260. The processor 254 may comprise suitable logic, circuitry, and/or code that may enable processing of information and/or data associated with the transmission and reception of signals at the MS 140. The processor 254 may, for example, compute frequency adjustment values for adjustment of a current demodulation frequency utilized by the receiver 260. The memory 256 may comprise suitable logic, circuitry, and/or code that may store data and/or control information that may be utilized in the operation of at least a portion of the MS 140. For example, the memory 256 may be utilized to store intermediate results of calculations related to AFC.

The transmitter 258 may comprise suitable circuitry, logic, and/or code that may be utilized to transmit signals wirelessly. The transmitter 258 may perform coding functions, signal modulation, and/or signal amplification. The receiver 260 may comprise suitable circuitry, logic, and/or code that may be utilized to receive wireless signals. The receiver 260 may perform decoding functions, signal demodulation, and/or signal amplification. The receiver 260 may also detect frequency offsets based on received signals. The antenna 262 may comprise suitable circuitry, logic, and/or code that may enable the reception and/or transmission of wireless signals.

Figure 3:
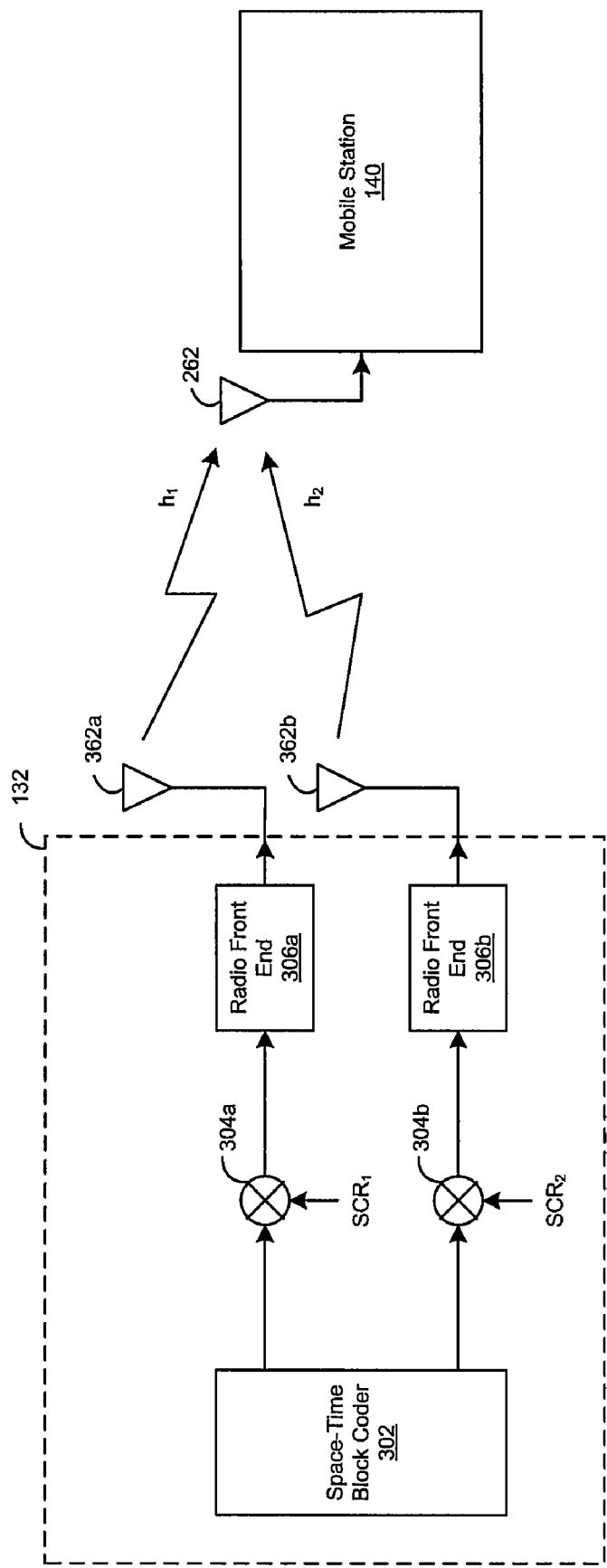
FIG. 3 is an exemplary system for transmit diversity, which may be utilized in connection with an embodiment of the invention.

FIG. 3 is an exemplary system for transmit diversity, which may be utilized in connection with an embodiment of the invention. Referring to FIG. 3, there is shown a node B element 132, a plurality of transmitting antennas 362a and 362b, a mobile station (MS) 140, and a receiving antenna 262. The node B element 132 may comprise a space-time block coder (STBC) 302, a plurality of chip generator blocks 304a and 304b, and a plurality of radio front ends 306a and 306b. The transmitting antennas 362a and 362b may be substantially similar to the antenna 262.

The STBC 302 may comprise suitable logic, circuitry, and/or code that may enable output of symbols to at least one of plurality of space time streams at a given time instant. Each symbol may comprise constellation mapped data to be transmitted by the node B element 132. An exemplary node B element 132 may utilize a quadrature phase shift keying (QPSK) constellation for mapping at least a portion of the data to a corresponding symbol. At a current time instant, the STBC 302 may simultaneously output a value of the symbol on a first space time stream, and on a second space time stream. At a subsequent time instant, the STBC 302 may output the value of the symbol on a first space time stream, while outputting a value that is a complex conjugate of the symbol, or a negative value of the complex conjugate of the symbol, on a second space time stream.

The chip generator block 304a may comprise suitable logic, circuitry, and/or code that may enable generating a chip level output signal based on input symbols from a space time stream, and a scrambling code $SCR_1$. The chip level output signal may represent a spread spectrum version of the input symbols based on a spreading factor (SF) that is determined by the chip generator function implemented in the chip generator block 304a. The chip generator block 304b may be substantially similar to the chip generator block 304a. The chip generator block 304b may utilize a scrambling code $SCR_2$.

The RFE block 306a may comprise suitable logic, circuitry, and/or code that may enable generation of an RF signal from a chip level output signal. The RFE block 306a may generate the RF signal by utilizing at least one frequency carrier signal to modulate the RF chain signal. The RFE block 306a may generate an RF signal that comprises an in-phase (I) component, and/or a quadrature phase (Q) component. The modulated signal may be transmitted via the transmitting antenna 362a. The RFE block 306b may be substantially similar to the RFE block 306a.

In operation, a signal transmitted from the transmitting antenna 362a, $x_1$, may be received at the MS 140 via the receiving antenna 162. Similarly, a signal transmitted from the transmitting antenna 362b, $x_2$, may also be received at the MS 140 via the receiving antenna 262. The signal $x_1$ may be subjected to signal distortions, or fading, while being transmitted via the wireless communications medium between the transmitting antenna 362a, and the receiving antenna 262. The fading characteristic of the signal $x_1$ may be represented by the channel estimate $h_1$. Similarly, the signal $x_2$ may be subjected to fading while being transmitted via the wireless communications medium between the transmitting antenna 362b, and the receiving antenna 262. The fading characteristic of the signal $x_2$ may be represented by the channel estimate $h_2$. Thus, the signal received by the MS 140, y, may be represented as shown in the following equation:

$$y(t)=h_1 \cdot x_1(t^-)+h_2 \cdot x_2(t^-)+n(t) \quad \text{Equation [1]}$$

where n may represent noise associated with the wireless communications medium, t represents a time at which the signal y is received at the MS 140, and $t^-$ represents a time $t-\delta$, which represents an approximate time at which the signals $x_1$ and $x_2$ were transmitted from the node B element 132.

In many wireless communication environments, portions of the total energy of the transmitted signal $x_1$ depart the transmitting antenna 362a at a plurality of angles of departure (AOD). During transmission via the wireless communications medium, the different portions of the transmitted signal $x_1$ may travel via different paths to reach the receiving antenna 262. The number of different paths, and/or the length of each path, may depend upon the number of obstacles along the path, such as buildings, that may deflect the portion of the transmitted signal. The different portions of the transmitted signal may arrive at the receiving antenna 262 at various angles of arrival (AOA). Collectively, the plurality of portions of the transmitted signal, which arrive at the receiving antenna 262, may be referred to as a multipath, and each of the portions of the transmitted signal may be referred to as an individual path signal, $x_1^j$, where j represents an index for an individual path signal in a multipath. The various individual path signals may arrive at the receiving antenna 262 at different times. Thus, equation [1] may be modified to represent individual path signals as shown in the following equation:

$$y(t+(j-1)\cdot \epsilon)=h_1^j \cdot x_1^j(t^-)+h_2^j \cdot x_2^j(t^-)+n^j(t) \quad \text{Equation [2]}$$

where $\epsilon$ may represent a time interval between received individual path signals as indexed by the variable j.

Figure 4:
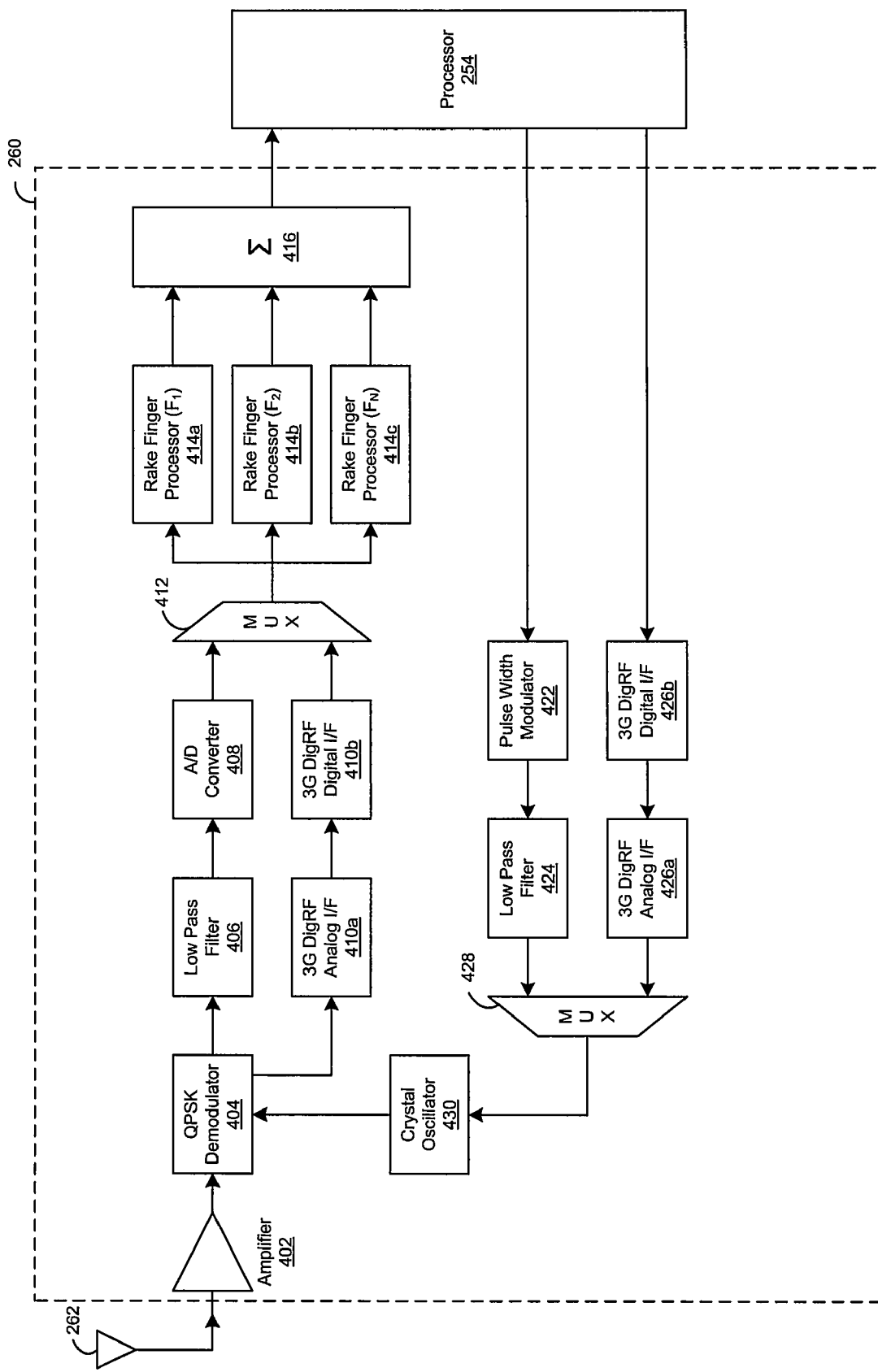
FIG. 4 is an exemplary receiver, in accordance with an embodiment of the invention.

FIG. 4 is an exemplary receiver, in accordance with an embodiment of the invention. Referring to FIG. 4, there is shown a receiving antenna 262, a receiver 260, and a processor 254. The processor 254 may be substantially as described in FIG. 2. The receiver 260 may comprise an amplifier 402, a quadrature phase shift keying (QPSK) demodulator 404, low pass filters (LPF) 406 and 424, an analog to digital (ND) converter 408, 3G digital radio frequency (DigRF) analog interfaces (I/F) 410a and 426a, 3G DigRF digital I/F 410b and 426b, multiplexers (MUXs) 412 and 428, a plurality of rake finger processors 414a, 414b, and 414c, a summing combiner 416, a crystal oscillator 430, and a pulse width modulator 422.

The amplifier 402 may comprise suitable logic, circuitry, and/or code that may enable amplification of an RF signal from the receiving antenna 262. The QPSK demodulator 404 may comprise suitable logic, circuitry, and/or code that may enable demodulation of an RF signal to a baseband signal. In various embodiments of the invention, the QPSK demodulator 404 may demodulate the RF signal to an intermediate frequency (IF) signal and subsequently convert the IF signal to the baseband signal. The baseband signal may comprise an I component and/or a Q component, each of which may, in turn, comprise a plurality of symbols. The QPSK demodulator 404 may convert symbols from corresponding I and/or Q components to analog signal levels based on a QPSK constellation. Various embodiments of the invention may not be practiced with other constellation types, for example binary phase shift keying (BPSK).

The LPF 406 may comprise suitable logic, circuitry, and/or code that may band limit the baseband signal from the QPSK demodulator 404 by attenuating amplitudes of frequency components in the baseband signal that are at frequencies, which are lower than the cutoff frequency associated with the LPF 406.

The A/D converter 408 may comprise suitable logic, circuitry, and/or code that may enable individual analog signal levels in a band limited baseband signal to be converted to a binary value. For example, when the analog signal levels are generated based on QPSK demodulation, each of the analog signal levels may be converted to 2 chips. Each chip may be represented in a voltage pulse of a determined time duration and determined voltage level. For example, a binary "1" may be represented by a voltage level of 3 volts, while a binary "0" may be represented by a voltage level of 0 volts. The A/D converter 408 may generate a digital baseband signal comprising a plurality of voltage pulses generated from the band limited baseband signal.

Various embodiments of the invention may also be practiced in conjunction with 3G DigRF I/F specifications. In this regard, 3G DigRF I/F specifications may define a standardized means for converting an RF signal to a baseband signal. The 3G DigRF I/F may be represented as comprising an analog portion, as shown by the 3G DigRF analog I/F 410a, and a 3G DigRF digital I/F 410b. The 3G DigRF analog I/F 410a may receive an analog RF signal. The 3G DigRF analog I/F 410a may generate a signal, based on 3G DigRF I/F specifications, that is communicated to the 3G DigRF digital I/F 410b. The 3G DigRF digital I/F 410b may generate a digital baseband signal.

The MUX 412 may comprise suitable logic, circuitry, and/ or code that may enable selection of a digital baseband signal that is generated from the ND converter 408, or from the 3G DigRF Digital I/F 410b. The MUX 412 may select a digital baseband signal in response to a control signal from the processor 254.

The digital baseband signal may comprise a sequence of complex signal values $y_n$, where $y_n$ represents approximate complex values of the received signal y(t) (as represented in Equation [1]) at time instants t=nT, where T represents a sampling time interval, and n represents an index value. Each value $y_n$ may represent chips, which may be descrambled and/or despread by utilizing a descrambling code and/or a despreading code to derive at least a portion of a received data symbol $d_n$.

In various embodiments of the invention, the received data symbol may be utilized for computing a frequency offset value relative to at least one previously received data symbol, and/or at least one subsequently received data symbol. When each value $y_n$ is descrambled and/or despread to generate a portion of a received data symbol, the data symbol $d_n$ may be derived by summing each of the constituent descrambled and/or despread values $y_n^k$, where k represents a constituent index to the data symbol $d_n$. For example, the data symbol $d_n$ may be derived by concatenating individual constituent descrambled and despread values $y_n^k$.

The rake finger processor 414a may comprise suitable logic, circuitry, and/or code that may enable reception, descrambling, and/or despreading of received digital baseband signals. In an exemplary embodiment of the invention, the rake finger processor 414a may generate descrambled and/or despread values $y_n$ that may be utilized to derive each received data symbol. The rake finger processor 414a may also generate descrambled and/or despread values $y_n^k$, which may be summed to derive each received data symbol. The rake finger processor 414a may enable reception of signals corresponding to individual path signal j=1 in equation [2].

In a system that utilizes STTD, the rake finger processor 414a may utilize a plurality of despreading and/or descrambling codes for despreading $y_n$, or $y_n^k$. For example, a first data symbol may be derived based on the despread and/or descrambled product $y_n \otimes SCR_1^*$, where $SCR_1^*$ may correspond to a despreading and/or descrambling code that corresponds to the scrambling code $SCR_1$. The first data symbol may be approximately equal to $h_1 \cdot x_1(t^-)$. A second data symbol may be derived based on the despread and/or descrambled product $y_n \otimes SCR_2^*$, where $SCR_2^*$ may correspond to a despreading and/or descrambling code that corresponds to the scrambling code $SCR_2$. The second data symbol may be approximately equal to $h_2 \cdot x_2(t^-)$. In various embodiments of the invention, a weighted sum may be computed based on the first and second data symbols.

The rake finger processor 414b may be substantially similar to the rake finger processor 414a. The rake finger processor 414b may enable reception of signals corresponding to individual path signal j=2 in equation [2]. The rake finger processor 414c may be substantially similar to the rake finger processor 414a. The rake finger processor 414c may enable reception of signals corresponding to individual path signal j=3 in equation [2].

The summing combiner 416 may comprise suitable logic, circuitry, and/or code that may enable computing a weighted average of values generated by the plurality of rake finger processors 414a, 414b, and 414c. In an exemplary embodiment of the invention, the summing combiner 416 may enable computation of a weighted average that is based on maximal ratio combining (MRC) of the values generated by the rake finger processors. In this exemplary embodiment of the invention, the rake finger processors may each generate one or more frequency offset values (for example, one frequency offset value for each received signal in an STTD system). In another exemplary embodiment of the invention, the summing combiner 416 may enable computation of a weighted average that is based on equal gain combining (EGO) of the values generated by the rake finger processors. In this exemplary embodiment of the invention, the rake finger processors may each generate one or more differential values.

The pulse width modulator 422 may comprise suitable logic, circuitry, and/or code that may enable generation of a pulse train signal where the time duration, or width, of an individual pulse may be determined based on an input signal from the processor 254. The input signal from the processor 254 may be determined based on a weighted average signal received from the summing combiner 416. The input signal may comprise an adjustment value. The time interval between rising edges of consecutive pulses may be constant. In various embodiments of the invention, the pulse width modulator 422 may be replaced by a pulse density modulator. The pulse density modulator may enable generation of a pulse train signal where the time interval between rising edges of consecutive pulses may be determined based on the input signal from the processor 254. The width of individual pulses may be constant. The LPF 424 may be substantially similar to the LPF 406. The LPF 424 may enable low pass filtering of the signal generated by the pulse width modulator 422.

The 3G DigRF analog I/F 426a may be substantially similar to the 3G DigRF analog I/F 410a. The 3G DigRF digital I/F 426b may be substantially similar to the 3G DigRF digital I/F 410b. The 3G DigRF digital I/F 426b may generate an output signal based on an input signal from the processor 254. The input signal from the processor 254 may be determined based on the weighted average signal received from the summing combiner 416. The input signal may comprise an adjustment value. The 3G DigRF analog I/F 426a may generate an analog signal based on an input signal from the 3G DigRF digital I/F 426b. The MUX 428 may be substantially similar to the MUX 412. The MUX 428 may enable selection of a signal from the LPF 424, or from the 3G DigRF analog I/F 426a.

The crystal oscillator 430 may comprise suitable logic, circuitry, and/or code that may enable generation of a demodulator signal whose frequency may be adjusted based on the selected signal received from the MUX 428. The demodulator signal may be utilized by the QPSK demodulator 404 to demodulate subsequent received signals.

In operation, the QPSK demodulator 404 may utilize a current demodulation frequency, associated with the demodulator signal received from the crystal oscillator 430, to demodulate a current received signal y(t). Based the current received signal, and one or more previously received signals, each of the rake finger processors 414a, 414b, and/or 414c may compute a frequency offset, or a difference value. The summing combiner 416 may compute a weighted average of the output signals from the rake finger processors that is communicated to the processor 254. The processor 254 may utilize the weighted average to compute a frequency offset value and/or to compute an adjustment value to be utilized for adjusting the demodulating frequency of the demodulator signal from the crystal oscillator 430. The processor 254 may communicate the computed adjustment value to the pulse width modulator 422 and/or the 3G DigRF digital I/F 426b, which may generate signals to effect an adjustment of the demodulation frequency of the demodulator signal from the crystal oscillator 430. The adjusted demodulation frequency may be utilized to demodulate subsequent received signals y(t).

Figure 5:
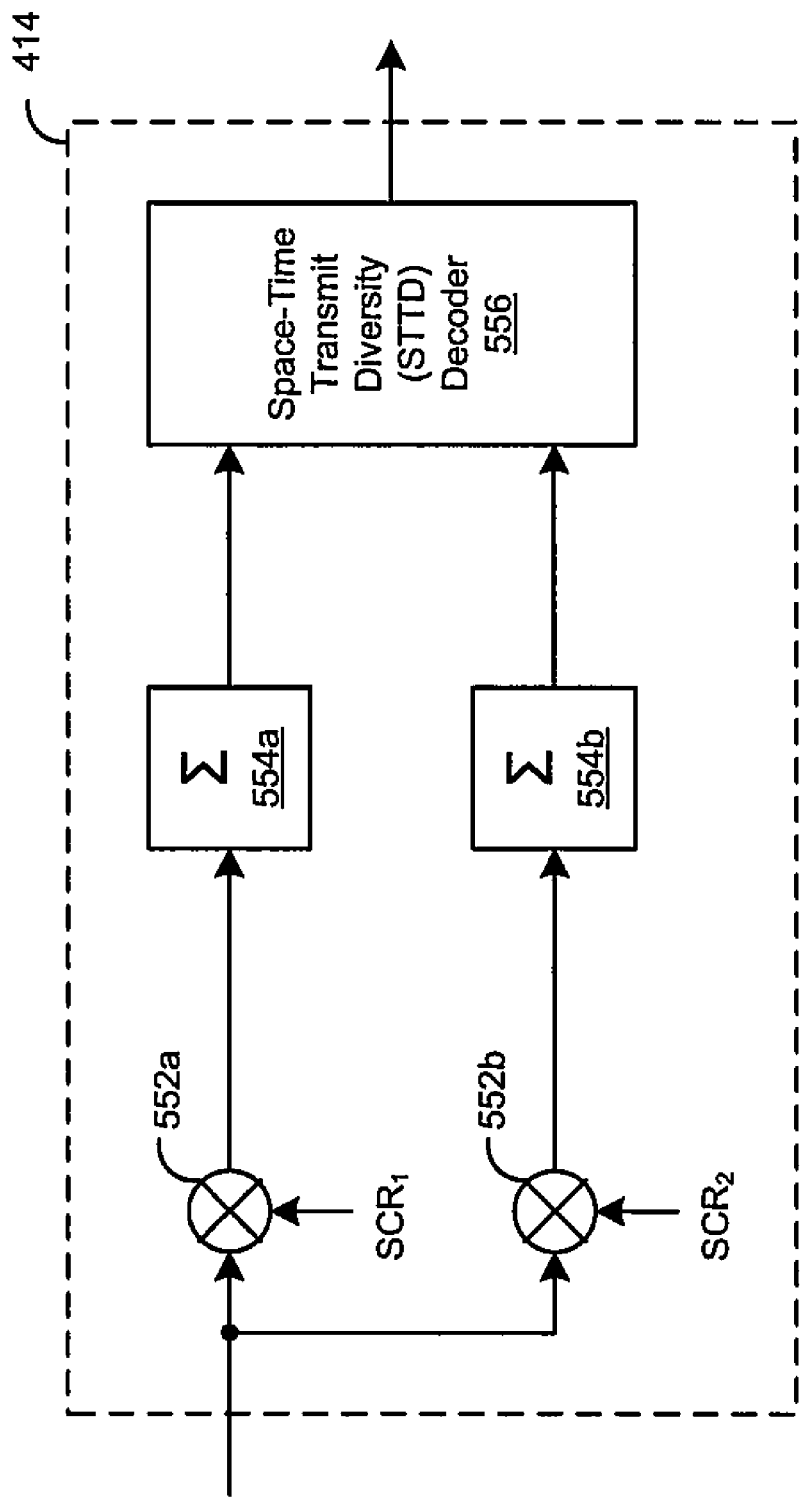
FIG. 5 is a block diagram of an exemplary rake finger processor, in accordance with an embodiment of an invention.

FIG. 5 is a block diagram of an exemplary rake finger processor, in accordance with an embodiment of an invention. Referring to FIG. 5, there is shown a rake finger processor 414. The rake finger processor 414 may represent any of the rake finger processors 414a, 414b, and/or 414c as shown in FIG. 4. The rake finger processor 414 may comprise a plurality of descrambler blocks 552a and 552b, a plurality of accumulator blocks 554a and 554b, and an STTD decoder block 556.

The descrambler block 552a may comprise suitable logic, circuitry, and/or code that may enable a chip level signal to be descrambled to generate a descrambled signal. The descrambler block 552a may utilize a descrambling code SCR; when descrambling the descrambled signal. In various embodiments of the invention, when the length of the descrambling code is less than the length of the data symbol (as measured in chips) the descrambling code SCR; may enable generation of a portion of the a data symbol.

A chip level signal received by the descrambler block 552a in the rake finger processor 414a may be approximated based on equation [2] as in the following equation (for an individual path signal associated with the index j=1):

$$y(nT) \cong h_1^1 \cdot x_1^1(nT^-) + h_2^1 \cdot x_2^1(nT^-) + n^1(nT) \quad \text{Equation [3]}$$

The descrambled signal, $\hat{y}(nT)$, may be represented as in the following equation:

$$\hat{y}(nT) \cong h_1^1 \cdot x_1^1(nT^-) \otimes SCR_1^* + h_2^1 \cdot x_2^1(nT^-) \otimes SCR_1^* + n^1(nT) \otimes SCR_1^* \quad \text{Equation [4]}$$

The descrambled signal may comprise pilot symbols received via the CPICH, for example.

The descrambler block 552b may be substantially similar to the descrambler block 552a. The descrambler block 552b may utilize a descrambling code $SCR_2^*$ when descrambling the chip level signal.

The accumulator block 554a may comprise suitable logic, circuitry, and/or code that may enable detection of energy from a descrambled signal. When the descrambled signal contains energy from a plurality of signals, the accumulator block 554a may enable threshold detection of signal levels to select a signal from the plurality of signals. The accumulator block 554a may generate a data symbol level signal. For example, the accumulator block 554a may generate a data symbol level signal $d_n$ from a descrambled signal $\hat{y}(nT)$ (as shown in equation [4]) by computing a summation over the number of chips contained in the descrambling code as shown in the following equation (for a descrambling code comprising M chips):

$$d_n \cong \sum_{m=1}^{M} [h_1^1 \cdot x_1^1(nT^-)](m) \cdot scr_1^*(m) + \sum_{m=1}^{M} [h_2^1 \cdot x_2^1(nT^-)](m) \cdot scr_1^*(m) + \sum_{m=1}^{M} n^1(nT)(m) \cdot scr_1^*(m) \quad \text{Equation [5]}$$

where m is an index for an individual chip, X(m) is a reference to an individual chip from the plurality of chips represented by the variable X, and [Y](m) is a reference to an individual chip from the plurality of chips represented by the expression [Y]. The value M may define an accumulation window.

For a chip level signal $x_1(t)$, which is generated by scrambling data $s_1$ with a scrambling code, $SCR_1$, and a chip level signal $x_2(t)$, which is generated by scrambling data $s_2$ with an orthogonal scrambling code, $SCR_2$, equation [5] may be approximated as shown in the following equation:

$$d_n \cong \sum_{m=1}^{M} h_1^1 \cdot \hat{s}_1(nT) \cdot scr_1(m) \cdot scr_1^*(m) \quad \text{Equation [6a]}$$

$$d_n \cong h_1^1 \cdot \hat{s}_1(nT) \quad \text{Equation [6b]}$$

where $\hat{s}_1$ may represent an estimated value for the data $s_1$. In various embodiments of the invention, a value for the number of chips M may be selected. The accumulator block 554a may be configured for an accumulator window size, M, based on a control signal received from the processor 254, which may select the value for M.

The accumulator block 554b may be substantially similar to the accumulator block 554a.

The STTD decoder block 556 may comprise suitable logic, circuitry, and/or code that may enable computation of a frequency offset value and/or of a differential value. In an exemplary embodiment of the invention, the frequency offset value may be computed based on at least one current data symbol level signal, $d_n$, and a corresponding at least one previously received data symbol level signal, $d_m$. Each of the current data symbol level signals may be received from an accumulator block 554a or 554b. The STTD decoder block 556 may store previously received data symbol level signals for use when computing frequency offset values and/or differential values. The STTD decoder block 556 may compute frequency offset values and/or differential values based on a $j^{th}$ individual path signal $y(t+(j-1)\cdot\epsilon)$ as shown in equation [2].

Figure 6:
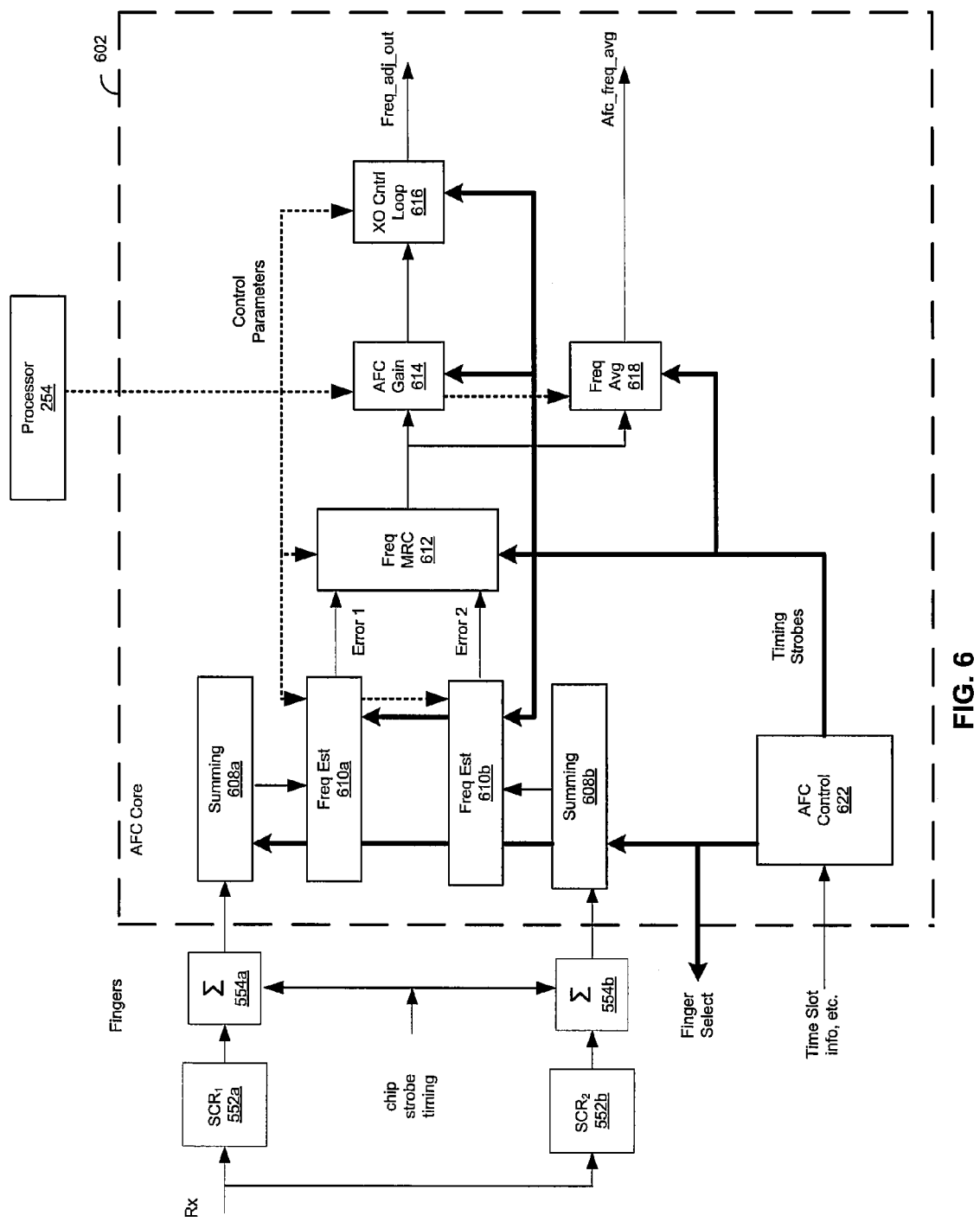
FIG. 6 is a block diagram of exemplary automatic frequency control core circuitry, in accordance with an embodiment of the invention.

FIG. 6 is a block diagram of exemplary automatic frequency control core circuitry, in accordance with an embodiment of the invention. Referring to FIG. 6, there is shown a plurality of descrambler blocks 552a and 552b, a plurality of accumulator blocks 554a and 554b, automatic frequency control (AFC) core circuitry 602, and a processor 254. The AFC core circuitry 602 may comprise a plurality of summing blocks 608a and 608b, a plurality of frequency estimator blocks 610a and 610b, a maximal ratio combining (MRC) block 612, an AFC gain block 614, a crystal oscillator (XO) control loop block 616, a frequency averaging block 618, and an AFC control block 622.

The AFC control block 622 may generate timing signals that may enable determination of timing for receiving individual path signals. These signals may enable timing for the activation of individual rake finger processors 414a, 414b, and/or 414c. The AFC control block 622 may also generate timing signals that may enable delineation of time slot boundaries within a WCDMA frame. The AFC control block 622 may communicate timing signals to the summing blocks 608a and 608b, the frequency estimator blocks 610a and 610b, the MRC block 612, the AFC gain block 614, the XO control loop block 616, and the frequency averaging block 618.

In various embodiments of the invention, the rake finger processors 414a, 414b, and/or 414c may be implemented as individual hardware modules, or the rake finger processors 414a, 414b, and/or 414c may be implemented as individual logical modules that utilize a common hardware module whose timing for selection of individual path signals is controlled by timing signals from the AFC control block 622.

Each of the plurality of descrambler blocks 552a and 552b may be substantially as described in FIG. 5. Each of the plurality of accumulator blocks 554a and 554b may be substantially as described in FIG. 5. Each of the accumulator blocks may receive a chip strobe timing signal that enables the accumulator block to generate a data symbol level signal as shown in equation [5]. The chip strobe timing signal may enable the accumulator blocks to perform computations that span an accumulator window, wherein the size of the accumulator window may be determined based on the value of the variable M.

The summing block 608a may comprise suitable logic, circuitry, and/or code that may enable computation of a data symbol based on a data symbol level input signal received from the accumulator block 554a. When the accumulator window comprises at least a portion of a data symbol, or data symbol segment, the summing block 608a may sum individual received data symbol segments from the accumulator block 554a to derive a full data symbol. In an exemplary embodiment of the invention, the summing block 608a may comprise a first-in, first-out (FIFO) memory. The FIFO memory may generate the full data symbol storing the received data symbol segment, and/or by concatenating the received data symbol segment from the accumulator block 554a to an intermediate data symbol stored in the FIFO that comprises data symbol segments that were previously received.

The length of the full data symbol stored in the summing block 608a, and the length of each received data symbol, or data symbol segment, from the accumulator block 554a may each be independently selected. The length of the data symbol segment from the accumulator block 554a may be determined based on the accumulator window size parameter M. The value M may be selected based on, for example, noise considerations. Referring to equation [5], the second and third terms may represent noise in the descrambled signal. The second and third terms in equation [5] may be characterized as being stochastically distributed with a 0 mean value. Larger values of M may correspond to a greater probability that the second and third terms in equation [5] may tend toward their statistical mean values. Thus, the larger the value M, the smaller the noise component in equation [5] may be.

The length of the full data symbol may be equal to M when the length of the full data symbol is equal to the length of the accumulator window for the accumulator block 554a. Alternatively, the length of the full data symbol may be measured based on the sum of the number of chips contained in each constituent data symbol segment when the length of the full data symbol is greater than the length of the accumulator window. The summing block 608a may receive timing strobe signals from the AFC control block 622 that enable the summing block 608a to delineate timing boundaries for receipt of individual path signals. The timing strobe signals may also enable the summing block 608a to delineate time slot boundaries within a WCDMA frame, for example. The summing block 608b may be substantially as described for the summing block 608a.

The frequency estimator block 610a may comprise suitable logic, circuitry, and/or code that may enable computation of a frequency error estimate based on a current received full data symbol, and on at least one previously received full data symbol. In an exemplary embodiment of the invention, a full data symbol may comprise 8 data symbol segments. In general, the number of data symbol segments per full data symbol may be represented by the variable W. A current full data symbol may comprise the 8 most recently received data symbol segments including the current data symbol segment, while the previous full data symbol may comprise the 8 data symbol segments that were received previous to the current data symbol segment. A computed error value between the current full data symbol and the previous full data symbol may be computed by: first, computing a partial error value based on a data symbol segment in the current full data symbol, and a corresponding data symbol segment in the previous full data symbol; and second, summing the W partial error values.

Various embodiments of the invention provide a sliding window that enables a new error value to be computed each time a data symbol segment is received. This contrasts with other methods for computing an error value in which: first, a current full data symbol may be accumulated based on the receipt of each of the constituent data symbol segments; second, a subsequent full data symbol may be accumulated based on receipt of the constituent data symbol segments; and third, the error value may be computed based on the subsequent (now current) full data symbol, and the current (now previous) full data symbol. In the alternative method, a new error value may be computed each time a plurality of W data symbol segments may be received.

In an exemplary embodiment of the invention, the frequency estimator block 610a may receive a current data symbol segment, which may be expressed in complex notation as shown in the following equation:

$$a_n \cdot \cos(\phi_n) + j \cdot a_n \cdot \sin(\phi_n) \qquad \text{Equation [7a]}$$

where $a_n$ may represent an amplitude for the current data symbol segment and $\phi_n$ may represent a phase value for the current data symbol segment. The frequency estimator block 610a may store a previously received full data symbol for which the data symbol segment corresponding to equation [7a] may be expressed in complex notation as shown in the following equation:

$$a_{n-1} \cdot \cos(\phi_{n-1}) + j \cdot a_{n-1} \cdot \sin(\phi_{n-1}) \qquad \text{Equation [7b]}$$

where $a_{n-1}$ may represent an amplitude for the previous data symbol segment and $\phi_{n-1}$ may represent a phase value for the previous data symbol segment.

The frequency estimator block 610a may generate an approximate partial error value that is computed as shown in the following equation, for example:

$$a_n \cdot a_{n-1} \cdot (\sin(\phi_n) \cdot \cos(\phi_{n-1}) - \cos(\phi_n) \cdot \sin(\phi_{n-1})) = a_n \cdot a_{n-1} \cdot \sin(\phi_n - \phi_{n-1}) \qquad \text{Equation [8a]}$$

where the quantity:

$$\Delta\phi_{mod_W(n-2)} = \phi_n - \phi_{n-1} \qquad \text{Equation [8b]}$$

may represent a frequency offset value between the current received data symbol segment and the corresponding previous data symbol segment. The index for the frequency offset value, $mod_W(n-2)$, may represent the base W modulus value of the expression (n−2). The frequency offset value may also be referred to as a frequency error value. For small values of $\Delta\phi$, the partial error value as shown in equation [8a] may be approximated as in the following equation:

$$a_n \cdot a_{n-1} \cdot \sin(\phi_n - \phi_{n-1}) \approx a_n \cdot a_{n-1} \cdot \Delta\phi_{mod_W(n-2)} \qquad \text{Equation [8c]}$$

where the quantity:

$$a_n \cdot a_{n-1} \qquad \text{Equation [8d]}$$

may correspond to a value for a weighting factor that is computed in connection with MRC. An error value may be computed across the current full data symbol, and the previous full data symbol by computing a sum of partial error values between each symbol segment in the current full symbol, and each corresponding symbol segment in the previous full symbol.

The frequency estimator block 610b may be substantially similar to the frequency estimator block 610a. Various embodiments of the invention are not limited to summing W partial error values. For example, an error value may be computed based on summing of fewer than W partial error values. In an exemplary embodiment of the invention, an error value may be computed based on computation of a single partial error value.

Based on timing signals received from the AFC control block 622, the frequency estimator blocks 610a and 610b may compute error values for each individual path signal in a received multipath. The timing for reception of each individual path signal may correspond to a distinct "finger" in a rake receiver.

The MRC block 612 may comprise suitable logic, circuitry, and/or code that may enable summing of error values from the frequency estimator blocks 610a and 610b for each finger in the rake receiver. As shown in equation [8c], each partial error value comprises a frequency offset value $\Delta\phi$ that is multiplied by a weighting factor that corresponds to a value utilized for MRC. Consequently, the output from the MRC block 612 may comprise a weighted sum that is computed based on MRC of frequency offset values.

The AFC gain block 614 may comprise suitable logic, circuitry, and/or code that may enable scaling of the weighted sum computed by the MRC block 612. The scaling of the weighted sum by the AFC gain block 614 may control the rate of AFC adjustment for the demodulation frequency of the crystal oscillator 430 in response to generated MRC block 612 output values.

The XO control loop 616 may comprise suitable logic, circuitry, and/or code that may enable generation of an XO control voltage based on a scaled weighted sum value generated by the AFC gain block 614. The control voltage may represent an adjustment value that adjusts a current demodulation frequency in the crystal oscillator 430. The adjusted demodulation frequency may be utilized for receiving subsequent signals y(t).

The frequency averaging block 618 may comprise suitable logic, circuitry, and/or code that may enable computation of an average value for weighted sum values computed by the MRC block 612 over a long time interval in comparison to the rate at which individual weighted sum values are computed.

In operation, a MS 140 may receive a signal via a receiving antenna 262. The received signal may be demodulated by a QPSK demodulator 404 based on a demodulation frequency generated by a crystal oscillator 430. The descrambling blocks 552a and 552b may descramble the received signal that was transmitted by a node B element 132 that utilized STTD. The accumulator blocks 554a and 554b and corresponding summing blocks 608a and 608b may enable deriving current data symbols. The frequency estimator blocks 610a and 610b may compute an error value based on a computed frequency offset value that may be derived from the current data symbol and a previous data symbol. The frequency offset value may be computed by computing a partial error value for each pair of corresponding current data symbol segments and previous data symbol segments, and summing the computed partial error values as shown in equations [8]. The MRC block 612 may compute a weighted sum based on a plurality of computed error values from the frequency estimator blocks 610a and 610b. The weighted sum may be utilized to generate an adjustment value that may be utilized for adjusting the frequency of the crystal oscillator 430. The adjusted frequency oscillator value may be utilized by the QPSK demodulator 404 to demodulate a subsequent received signal. The processor 254 may select an accumulator window size for the accumulator blocks 554a and/or 554b, and/or select a data symbol length for the summing blocks 608a and/or 608b, in response to weighted sum values computed by the MRC block 612.

Various embodiments of the invention may be practiced when the MS 140 comprises a plurality of receiving antennas. In such case, a received signal may be received at each receiving antenna, and the MS 140 may comprise duplicate circuitry for each receiving antenna. The duplicate circuitry may comprise the descrambler blocks 552a and 552b, the accumulator blocks 554a and 554b, the summing blocks 608a and 608b, and frequency estimator blocks 610a and 610b.

Figure 7:
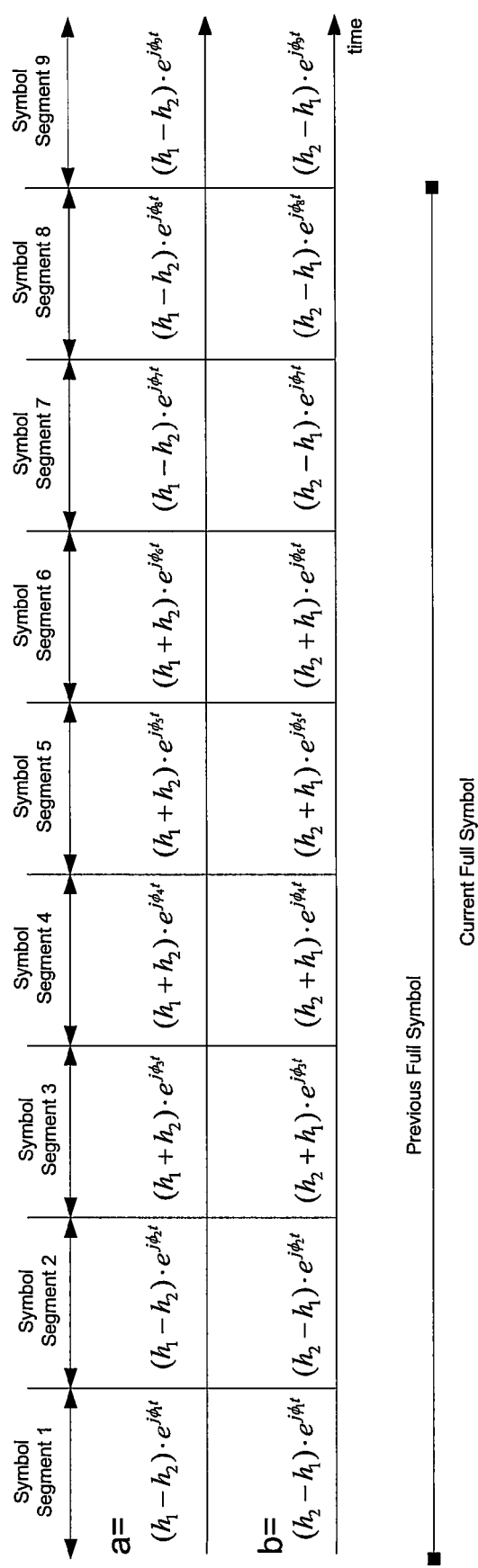
FIG. 7 is an exemplary illustration of data symbol segments for an AFC system supporting transmitter diversity, which may be utilized in accordance with an embodiment of the invention.

FIG. 7 is an exemplary illustration of data symbol segments for an AFC system supporting transmitter diversity, which may be utilized in accordance with an embodiment of the invention. Referring to FIG. 7, there is shown a plurality of data symbol segments: 1-9. Each data segment may comprise M chips. The first row of data symbol segments, labeled "a=", may correspond to a signal processed by the accumulator block 554a summing block 608a, and frequency estimator block 610a. The second row of data symbol segments, labeled "b=", may correspond to a signal processed by the accumulator block 554b summing block 608b, and frequency estimator block 610b. The first row of data symbol segments may have been transmitted from the node B element 132 via transmitting antenna 362a. The second row of data symbol segments may have been transmitted from the node B element 132 via transmitting antenna 362b. The signals transmitted from the transmitting antennas 362a and 362b may have been received at the mobile station (MS) 140 via the receiving antenna 262.

The current full symbol may comprise data symbol segments 2-9, while the previous full data symbol may comprise data symbol segments 1-8. In this regard, the data symbol segment labeled as symbol segment 2, $(h_1-h_2)\cdot e^{j\Phi_2 t}$, in FIG. 7, may correspond to data symbol segment 1 in the current full data symbol, and data symbol segment 2 in the previous full data symbol. The data symbol segment labeled as symbol segment 1, $(h_1-h_2)\cdot e^{j\Phi_1 t}$, in FIG. 7, may correspond to data symbol segment 1 in the previous full data symbol. From equation [8c], a partial error value may be computed for the first data symbol segment in the current full data symbol, and the corresponding first data symbol segment in the previous full data symbol as shown in the following equation:

$$(h_1-h_2)\cdot(h_1-h_2)\cdot\sin(\phi_2-\phi_1)\cong(h_1-h_2)^2\cdot\Delta\phi_0 \quad \text{Equation [9a]}$$

a partial error value may be computed for the second data symbol segment in the current full data symbol, and the corresponding second data symbol segment in the previous full data symbol as shown in the following equation:

$$(h_1+h_2)\cdot(h_1-h_2)\cdot\sin(\phi_3-\phi_2)\cong(h_1^2-h_2^2)\cdot\Delta\phi_1 \quad \text{Equation [9b]}$$

while a partial error value may be computed for the last data symbol segment in the current full data symbol, and the corresponding last data symbol segment in the previous full data symbol as shown in the following equation:

$$(h_1-h_2)\cdot(h_1-h_2)\cdot\sin(\phi_9\phi_8)\cong(h_1-h_2)^2\cdot\Delta\phi_7 \quad \text{Equation [9c]}$$

The error value computed across the full current data symbol may be computed by summing the computed partial error values for each of the constituent data symbol segments within the full current data symbol.

In various embodiments of the invention, a first error value may be computed after receipt of the ninth data symbol segment. A second error value may be computed after receipt of the tenth data symbol segment (not shown). For the second computed error value, the current full data symbol may comprise data symbols segments 3-10, and the previous full data symbol may comprise data symbols 2-9.

Figure 8:
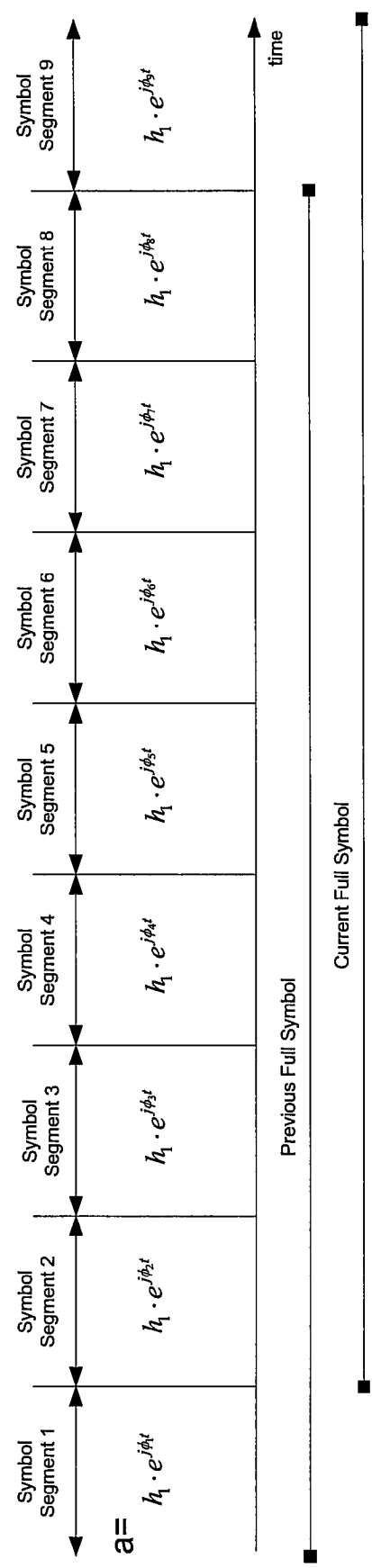
FIG. 8 is an exemplary illustration of data symbol segments for an AFC system without support for transmitter diversity, which may be utilized in accordance with an embodiment of the invention.

FIG. 8 is an exemplary illustration of data symbol segments for an AFC system without support for transmitter diversity, which may be utilized in accordance with an embodiment of the invention. Referring to FIG. 8, there is shown a plurality of data symbol segments: 1-9. The data symbol segments may have been transmitted from a node B element 132 via transmitting antenna 362a, and received at the MS 140 via receiving antenna 262. The computation of partial error values may be performed as described for FIG. 7.

Figure 9:
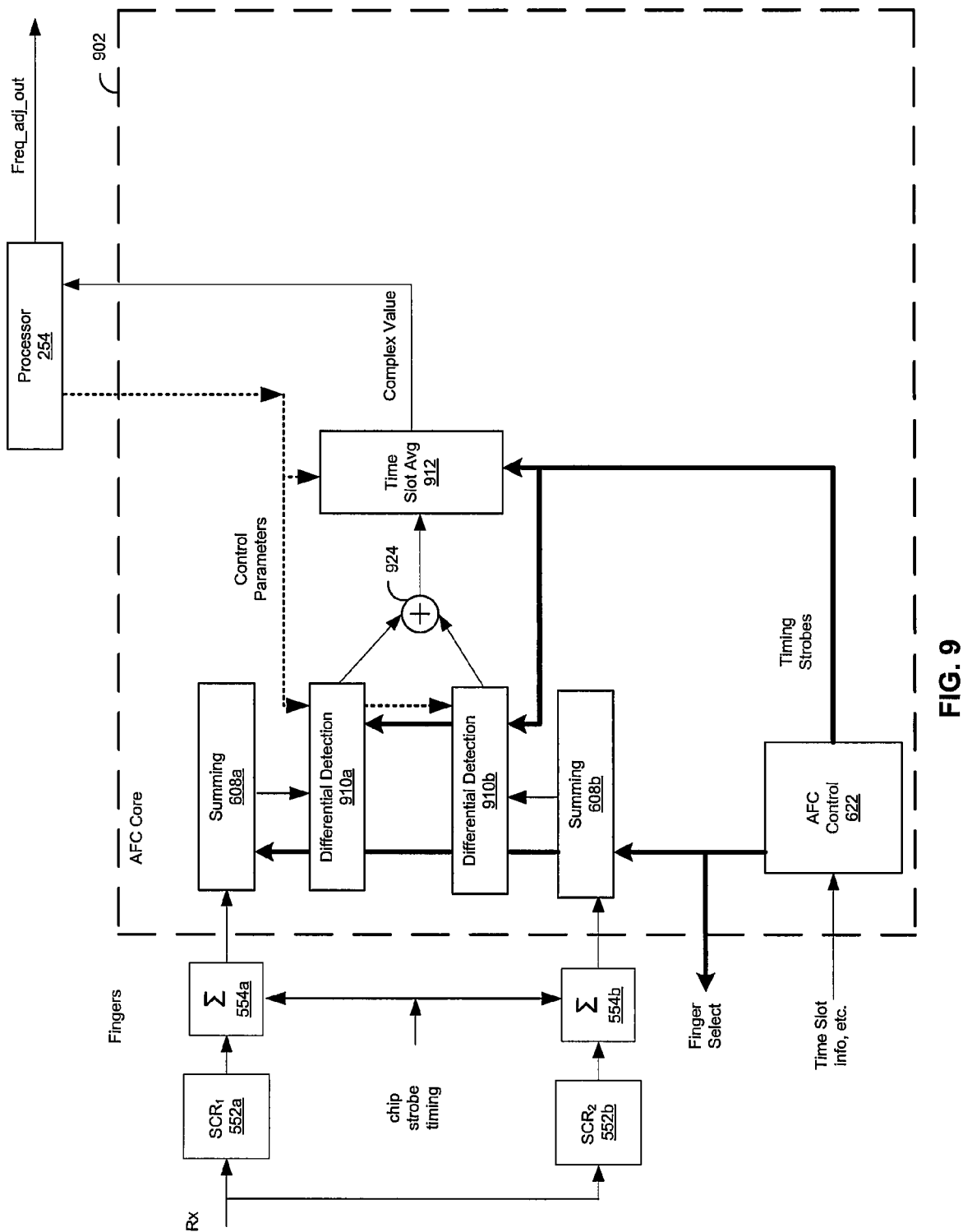
FIG. 9 is a block diagram of exemplary automatic frequency control core circuitry, in accordance with an embodiment of the invention.

FIG. 9 is a block diagram of exemplary automatic frequency control core circuitry, in accordance with an embodiment of the invention. Referring to FIG. 9, there is shown a plurality of descrambler blocks 552a and 552b, a plurality of accumulator blocks 554a and 554b, automatic frequency control (AFC) core circuitry 902, and a processor 254. The AFC core circuitry 902 may comprise a plurality of summing blocks 608a and 608b, a plurality of differential detection blocks 910a and 910b, a summation element 924, a time slot averaging block 912, and an AFC control block 622.

The differential detection block 910a may comprise suitable logic, circuitry, and/or code that may enable computation of a differential value based on a current received full data symbol, and on at least one previously received full data symbol. The differential value between the current full data symbol and the previous full data symbol may be computed by: first, computing a partial differential value based on a data symbol segment in the current full data symbol, and a corresponding data symbol segment in the previous full data symbol; and second, by summing the W partial differential values.

In an exemplary embodiment of the invention, the differential detection block 910a may receive a current data symbol segment, which may be expressed in complex notation as shown in the following equation:

$$r_n(t) = h(t) \cdot e^{j\phi_n t} \quad \text{Equation [10]}$$

where h(t) may represent a computed channel estimate associated with the current data symbol segment and $\phi_n$ may represent a phase value for the current data symbol segment.

The differential detection block 910a may store a previously received full data symbol for which the data symbol segment corresponding to equation 9 is $r_n^*(t-T_S)$, where $r_n^*(t-T_S)$ may represent a complex conjugate of the data symbol $r_n(t-T_S)$, and $T_S$ may represent a time duration for a full data symbol.

The differential detector block 910a may generate a partial differential value that is computed as shown in the following equation:

$$d_n(t) = r_n(t) \cdot r_n^*(t-T_S) \quad \text{Equation [11]}$$

When $d_n(t)$ is represented as real and imaginary components, $d_{n,I}(t)$ and $d_{n,Q}(t)$ respectively, the individual components may be computed as shown in the following equations, for example:

$$d_{n,I}(t) = h_I(t) \cdot h_I(t-T_S) + h_Q(t) \cdot h_Q(t-T_S) \quad \text{Equation [12a]}$$

$$d_{n,Q}(t) = h_Q(t) \cdot h_I(t-T_S) - h_Q(t-T_S) \cdot h_I(t) \quad \text{Equation [12b]}$$

The differential detector block 910b may be substantially similar to the frequency estimator block 910a.

Based on timing signals received from the AFC control block 622, the differential detector blocks 910a and 910b may compute error values as shown in equations [11] and [12] for each individual path signal in a received multipath. The timing for reception of each individual path signal may correspond to a distinct "finger" in a rake receiver.

The summation element 924 may comprise suitable logic, circuitry, and/or code that may enable generating a value equal to a summation of differential values computed by the differential detector blocks 910a and 910b for each finger. The time slot average block 912 may comprise suitable logic, circuitry, and/or code that may enable generating a weighted sum of input values received from the summation element 924. The weighted sum may be computed over a time interval that comprises a plurality of time slots. The weighted sum may represent a weighted average of input values received from the summation element 924, which may be computed based on equal gain combining (EGC), wherein the weighting factor for each input value is about equal. The time slot average block 912 may generate a weighted sum for each finger.

The processor 254 may compute an error value based on equations [12] as shown in the following equation:

$$\text{error} = \frac{d_Q(t)}{\sqrt{d_I^2(t) + d_Q^2(t)}} \quad \text{Equation [13a]}$$

where, for example:

$$d_I(k) = \sum_{j=1}^{M} \overline{d}_{j+k,I} \quad \text{Equation [13b]}$$

and $$d_Q(k) = \sum_{j=1}^{M} \overline{d}_{j+k,Q} \quad \text{Equation [13c]}$$

where $\overline{d}_n$ is an average value for $d_o$ from equations [11] and [12], for example as computed by the time slot average block 912, k may refer to a segment number, and M may refer to the length of the moving average.

For small error values, equation [13a] may be approximated as shown in the following equation:

$$\text{error} \cong \frac{d_Q(t)}{d_I(t)} = \frac{\sin(\Delta\phi)}{\cos(\Delta\phi)} \quad \text{Equation [14]}$$

where the frequency offset value, $\Delta\phi$, may be computed by computing a partial frequency offset value for each symbol segment in the current full symbol.

Based on the computed error value, an adjustment value may be computed. The adjustment value may be utilized to adjust the current demodulation frequency as described above.

Various embodiments of the invention may be practiced when the MS 140 comprises a plurality of receiving antennas. In such case, a received signal may be received at each receiving antenna, and the MS 140 may comprise duplicate circuitry for each receiving antenna. The duplicate circuitry may comprise the descrambler blocks 552a and 552b, the accumulator blocks 554a and 554b, the summing blocks 608a and 608b, the differential detection blocks 910a and 910b, the summation element 924, and the time slot average block 912.

Figure 10:
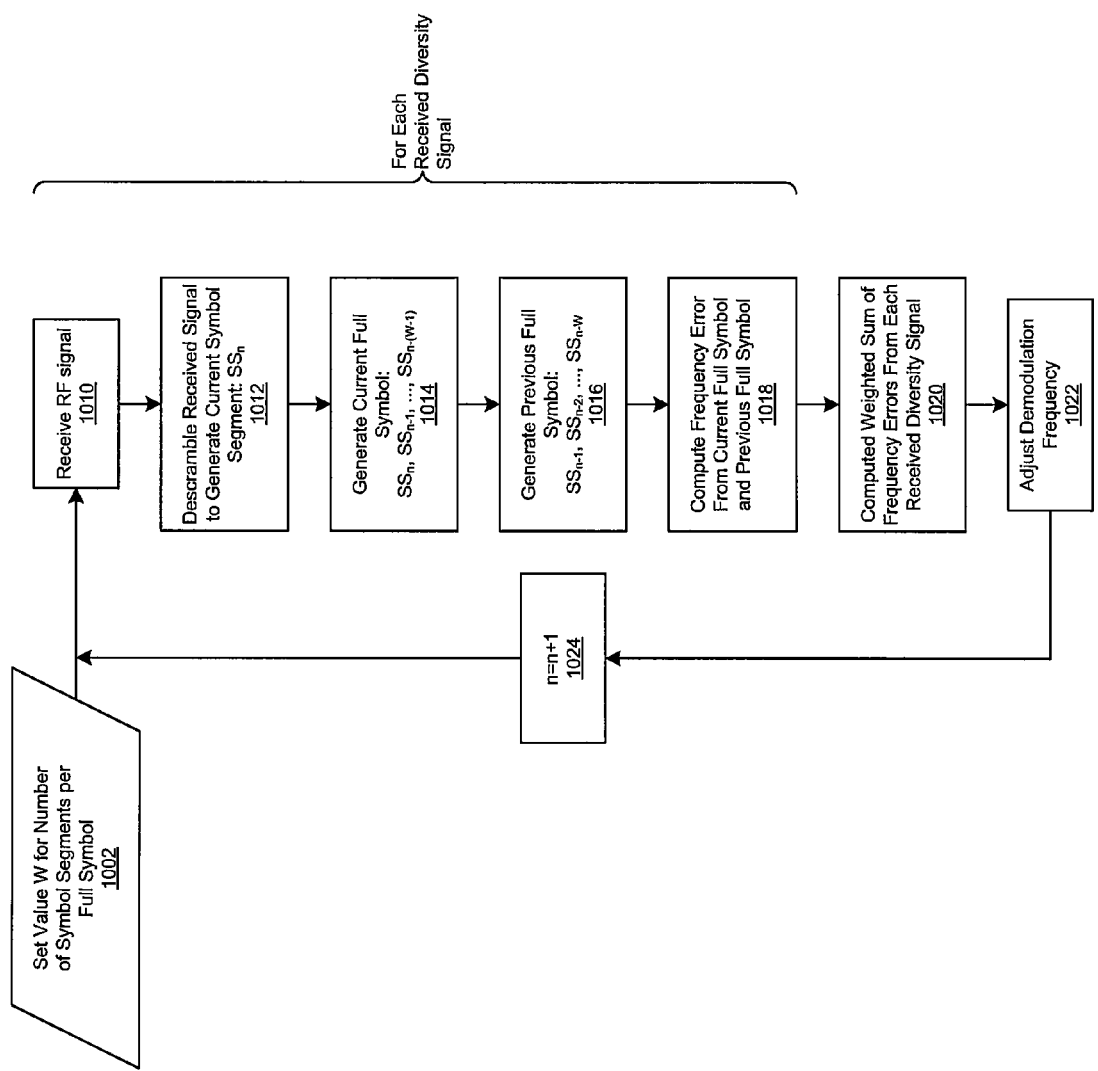
FIG. 10 is a flowchart that illustrates exemplary steps for AFC, in accordance with an embodiment of the invention.

FIG. 10 is a flowchart that illustrates exemplary steps for AFC, in accordance with an embodiment of the invention. Referring to FIG. 10, in step 1002, a value, W, may be set for determining the number of symbol segments contained in a full symbol.

Steps 1010-1018 may be performed iteratively for each received diversity signal. In various embodiments of the invention, each iteration may be performed in parallel. In step 1012, the received signal may be descrambled and/or despread to generate a current symbol segment, $SS_n$. In step 1014, a current full symbol may be generated by accumulating the current received symbol segment, $SS_n$, and the previous W−1 received symbol segments. The current full symbol may therefore comprise the symbol segments, $SS_n$, $SS_{n-1}, \ldots$, and $SS_{n-(W-1)}$. In step 1016, a previous full symbol may be generated by accumulating the previous W received symbol segments. The previous full symbol may therefore comprise the symbol segments, $SS_{n-1}, SS_{n-2}, \ldots$, and $SS_{n-W}$. In step 1018, a frequency error value may be computed based on the current full symbol and the previous full symbol.

In step 1020, a weighted sum may be computed based on the plurality of computed frequency error values computed for each of the received diversity signals. In step 1022, the demodulation frequency generated by the crystal oscillator 430 may be adjusted. In step 1024, the value for the index n, may be incremented. Step 1010 may follow step 1024.

Aspects of the system for a sliding window phase estimator for WCDMA automatic frequency correction may comprise AFC core circuitry 602, 702, and/or a processor 254 that enable adjustment of a current demodulation frequency for receiving at least one subsequent symbol based on a computed weighted sum of a plurality of computed frequency error values. Each of the plurality of computed frequency error values may be derived from a current symbol, a corresponding previous symbol, and/or a previous frequency error value. The current symbol may include a current received symbol segment and one or more previously received symbol segments.

The computed weighted sum may be computed based on maximal ratio combining of the plurality of computed frequency error values, or based on an equal gain combining of the plurality of computed frequency error values. The processor 254 may enable computation of an adjustment value for the adjustment of the current demodulation frequency based on the computed weighted sum.

A descrambler block 552a may enable generation of a current chip level signal as a result of demodulating a current received signal based on the current demodulation frequency. The accumulator block 554a may enable generation of the current received symbol segment as a result of despreading the current chip level signal by a corresponding despreading code. The processor 254 may enable selection of a number of chips for the corresponding despreading code based on at least one previous computed weighted sum.

The current symbol may comprise the current received symbol segment and a selected number of the most recently received of the one or more previously received symbol segments. The corresponding previous symbol may comprise the selected number of the most recently received of the one or more previously received symbol segments and a symbol segment received previous to a last of the selected number of the most recently received of the one or more previously received symbol segments.

The frequency estimator block 610a may enable computation of at least one of the plurality of computed frequency error values based on the corresponding at least one current phase value and the corresponding at least one previous phase value. The differential detection block 710a may enable computation of at least one of the plurality of computed frequency error values based on the current symbol and a complex conjugate of the corresponding previous symbol.

Various embodiments of the invention are not limited to wireless communication systems. Various embodiments of the invention may also be practiced in systems, which utilize pilot bits, pilot symbols, and/or pilot frequencies in a manner consistent with the methods and systems set forth above.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    determining, in a wireless device, a sum of a plurality of frequency error values associated with a current data symbol, wherein each of the plurality of frequency error values is based on a different segment of the current data symbol and on a corresponding segment of a previous data symbol; and
    adjusting a value of a demodulation frequency for a subsequent data symbol based on the determined sum of the plurality of frequency error values associated with the current data symbol.

2. The method of clam 1, wherein each of the plurality of frequency error values is based on a different set of segments of the current data symbol and on a corresponding set of segments of the previous data symbol.

3. The method of claim 1, comprising generating a chip level signal based on a signal demodulated utilizing a current value of the demodulation frequency.

4. The method of claim 3, comprising despreading the chip level signal by a corresponding despreading code to generate each segment of the current data symbol.

5. The method of claim 4, comprising selecting, based on a previously determined sum, a number of chips in the chip level signal to be despread by the corresponding despreading code.

6. The method of claim 1, comprising determining the frequency error value associated with a segment of the current data symbol based on a phase value of the segment and a phase value of the corresponding segment of the previous data symbol.

7. The method of claim 1, comprising determining the frequency error value associated with a segment of the current data symbol based on a complex conjugate of the corresponding segment of the previous data symbol.

8. The method of claim 1, wherein the determined sum is a weighted sum based on a maximal ratio combining of the plurality of frequency error values.

9. The method of claim 1, wherein the determined sum is a weighted sum based on an equal gain combining of the plurality of frequency error values.

10. The method of claim 1, comprising adjusting the value of the demodulation frequency for the subsequent data symbol based on a plurality of determined sums associated with a plurality of diversity signals received by the wireless device.

11. A system, comprising:
one or more processors and/or circuits operable to determine a sum of a plurality of frequency error values associated with a current data symbol, wherein each of the plurality of frequency error values is based on a different segment of the current data symbol and on a corresponding segment of a previous data symbol; and
the one or more processors and/or circuits operable to adjust value of a demodulation frequency for a subsequent data symbol based on the determined sum of the plurality of frequency error values associated with the current data symbol.

12. The system of clam 11, wherein each of the plurality of frequency error values is based on a different set of segments of the current data symbol and on a corresponding set of segments of the previous data symbol.

13. The system of claim 11, wherein the one or more processors and/or circuits operable to generate a chip level signal based on a signal demodulated utilizing a current value of the demodulation frequency.

14. The system of claim 13, wherein the one or more processors and/or circuits operable to despread the chip level signal by a corresponding despreading code to generate each segment of the current data symbol.

15. The system of claim 14, wherein the one or more processors and/or circuits operable to select, based on a previously determined sum, a number of chips in the chip level signal to be despread by the corresponding despreading code.

16. The system of claim 11, wherein the one or more processors and/or circuits operable to determine the frequency error value associated with a segment of the current data symbol based on a phase value of the segment and a phase value of the corresponding segment of the previous data symbol.

17. The system of claim 11, wherein the one or more processors and/or circuits operable to determine the frequency error value associated with a segment of the current data symbol based on a complex conjugate of the corresponding segment of the previous data symbol.

18. The system of claim 11, wherein the determined sum is a weighted sum based on a maximal ratio combining of the plurality of frequency error values.

19. The system of claim 11, wherein the determined sum is a weighted sum based on an equal gain combining of the plurality of frequency error values.

20. The system of claim 11, wherein the one or more processors and/or circuits operable to adjust the value of the demodulation frequency for the subsequent data symbol based on a plurality of determined sums associated with a plurality of diversity signals received by the wireless device.

* * * * *